United States Patent [19]
Jackson

[11] 3,976,229
[45] Aug. 24, 1976

[54] HOT MELT DISPENSING APPARATUS

[75] Inventor: Jordan S. Jackson, Northville, Mich.

[73] Assignee: Pyles Industries, Inc., Wixom, Mich.

[22] Filed: Mar. 31, 1975

[21] Appl. No.: 563,671

[52] U.S. Cl. .................. 222/146 HE; 219/296; 219/421; 222/261
[51] Int. Cl.² ............................. B67D 5/62
[58] Field of Search ..... 222/146 R, 146 H, 146 HE, 222/381, 405, 256–262; 219/296, 421

[56] References Cited
UNITED STATES PATENTS

| | | | |
|---|---|---|---|
| 1,929,231 | 10/1933 | Yirava | 222/146 HE X |
| 3,031,106 | 4/1962 | Hooker | 222/146 H |
| 3,113,705 | 12/1963 | Weitzel | 222/262 X |
| 3,282,469 | 11/1966 | Skouberg | 222/260 X |
| 3,758,003 | 9/1973 | Kautz et al. | 222/405 X |

Primary Examiner—Robert B. Reeves
Assistant Examiner—Joseph J. Rolla
Attorney, Agent, or Firm—Beaman & Beaman

[57] ABSTRACT

Apparatus for dispensing heat meltable material from a container including a heated head adapted to engage the upper surface of the material within the container to melt the material immediately below the head. The head includes an inlet passage whereby melted liquid material may enter a reservoir defined in the head, and a dispensing pump includes an inlet communicating with the head reservoir whereby the melted material is pumped from the head reservoir for dispensing purposes. The head inlet passage includes flow control means for retaining melted material within the reservoir, and the head includes means for improving the heat exchanging characteristics between the head and the material confined within the reservoir.

14 Claims, 5 Drawing Figures

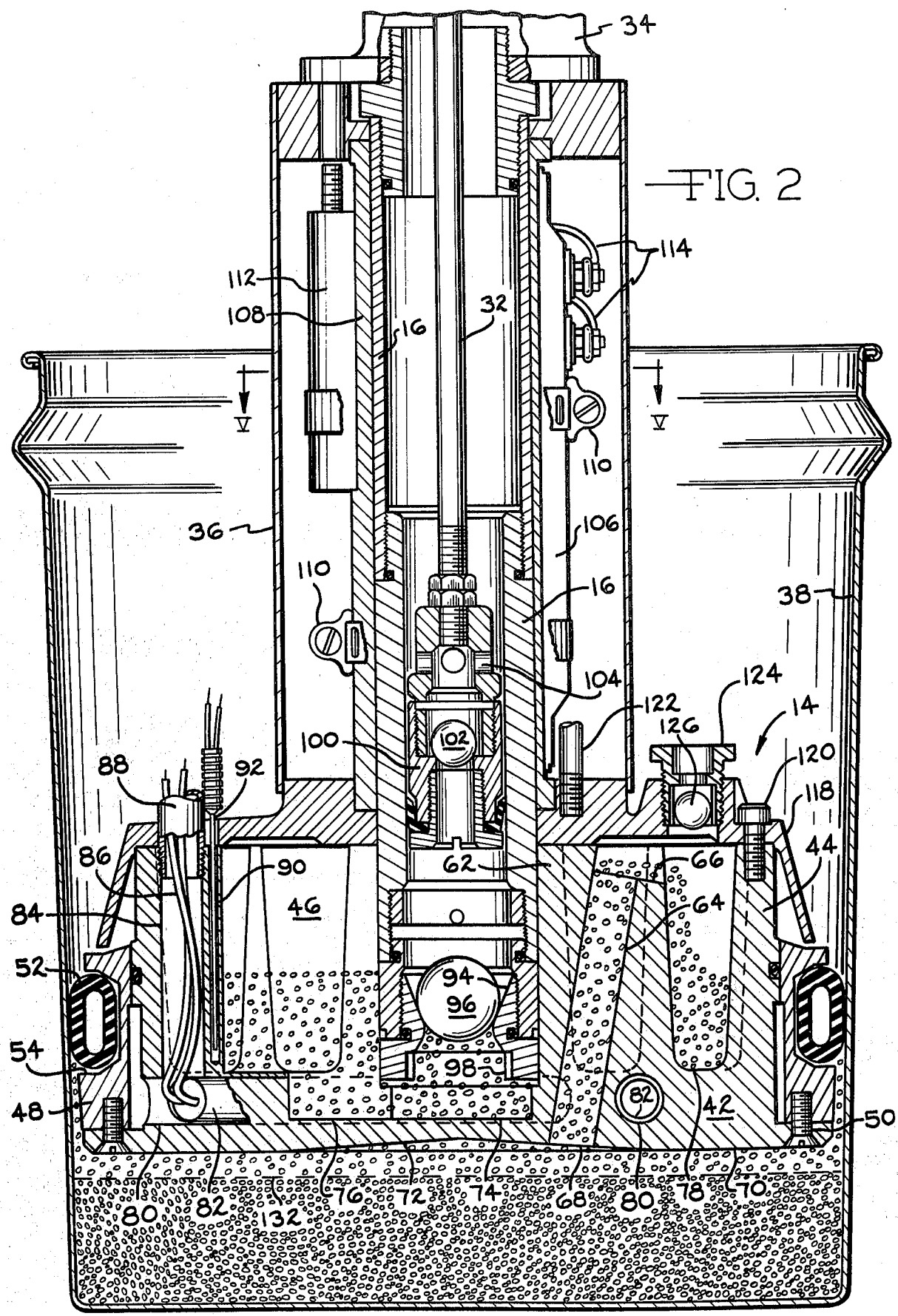

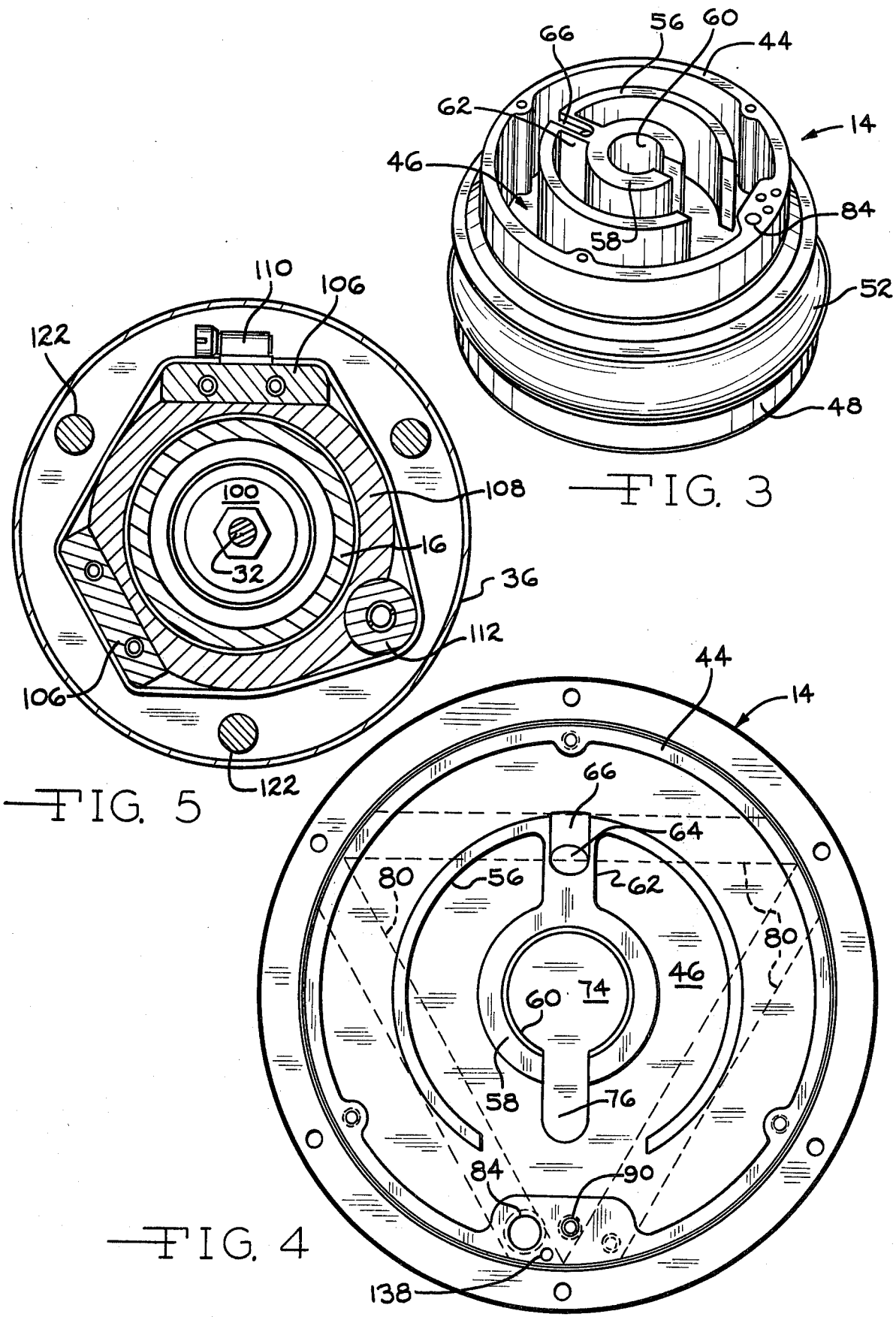

HOT MELT DISPENSING APPARATUS

BACKGROUND OF THE INVENTION

The invention pertains to dispensing means for heat meltable materials.

Heat meltable materials of thermoplastic nature, such as sealants, adhesives, etc., when used in large quantities, are often packaged and shipped in bulk containers, such as 55 gallon drums. The material is packaged while hot and in liquid form and then hardens upon cooling. To permit use of such materials when packaged in drums it is necessary to heat the material sufficiently to produce a fluid state wherein the material may be readily dispensed from the drum. Usually the entire contents of the drum are not used at once and many thermoplastic heat meltable materials are adversely affected due to degradation and induced polymerization if they are sequentially heated to a melted state and then permitted to cool and reharden during periodic dispensing. Accordingly, dispensing apparatus has been devised for heating and dispensing only that material adjacent the upper surface of the shipping container and thereby heating only a relatively small portion of the packaged material at a time. U.S. Pat. No. 3,282,469; 3,412,903 and 3,637,111 disclose apparatus of this type.

While known apparatus permits limited amounts of hardened material to be transformed into the liquid state for dispensing, and thereby minimizing deterioration of the material not to be immediately dispensed, known devices withdraw the liquid material directly from the container, often adjacent a heating element. Thus, before dispensing can occur, a significant delay is incurred while the temperature of the upper surface of the thermoplastic material reaches a liquid state and, further, since the dispensed liquid material is drawn directly from the container, the dispensing apparatus is rendered inoperable when the dispensing head is removed from the depleted container and prior to a new container of heat meltable material being available for dispensing.

As the dispensing apparatus in accord with the invention may be utilized in a production line environment, a plurality of dispensing devices may be necessary in order to assure an available supply of heat meltable material at all times, thus necessitating an expensive duplication of apparatus.

Further, known dispensing apparatus of the above heat meltable material type has not been available for use with relatively small containers, such as of 5 gallon capacity, wherein relatively continuous dispensing is possible, and while the smaller size dispensing apparatus is very attractive to the user of limited quantities of heat meltable materials or wherein a variety of material compositions are being used, the disadvantages of interruptions due to delays arising from changing from a depleted to a filled container adversely affected the economic advantages of previous dispensing apparatus of smaller capacities.

SUMMARY OF THE INVENTION

It is an object of the invention to provide apparatus for dispensing heat meltable apparatus wherein a heated head engaging the meltable material includes a reservoir for receiving melted material and the dispensing of the melted material is from the head reservoir, rather than from the material container directly. This feature permits storage of a predetermined amount of heat meltable material for dispensing purposes to assure a supply thereof during changing from a depleted container to a new supply, and provides a continuity of operation permitting smaller containers of heat meltable material practical to be used under continuous production line requirements.

A further object of the invention is to provide a dispenser for heat meltable material utilizing a heated head for melting a limited amount of packaged and confined thermoplastic material adjacent the upper surface thereof wherein the head includes a reservoir for receiving meltable material, a dispensing pump dispenses from the head reservoir, and inlet means permit the melted material to enter the head reservoir, but control and prevent egress of the melted material from the reservoir through the inlet.

An additional object of the invention is to provide dispensing apparatus for heat meltable material utilizing a heated head engaging the upper surface of the meltable material wherein a reservoir defined within the head includes a base region having electric resistance heaters mounted therein, the head reservoir including a well receiving the inlet of the dispensing pump, and heat exchanging means extending from the base region into the reservoir to improve the heat transfer from the head into the material confined within the reservoir. In the practice of the invention a head of a generally circular configuration having sealing means located about its periphery is closely received within the container of heat meltable material, such as an adhesive. The head includes a lower surface adapted to engage the upper surface of the material, and heating means defined in a base region of the head adjacent the head lower surface heats the head sufficiently to melt the material adjacent the head lower surface. An inlet passage defined in the head communicating with the lower surface permits the melted material to enter a reservoir defined in the head, and the melted material enters the upper region of the reservoir whereby return flow of the meltable material through the inlet is limited to only that material within the inlet passage itself.

A well is centrally defined in the reservoir at the head base region, and a piston type pump includes an inlet communicating with the reservoir well for withdrawing that heat meltable material therefrom in its liquid state. A plurality of heat exchangers, in the form of generally circular webs extend upwardly into the reservoir from the head base region to rapidly transfer heat from the base region to the meltable material within the reservoir, and this feature permits a supply of melted material to be available soon after energizing the apparatus even though the material within its container immediately adjacent the head may not be sufficiently melted to permit flow of melted material into the head reservoir.

The dispensing apparatus in accord with the invention permits continuity of operation and shortens the melting duration after the heat meltable material has hardened and makes the dispensing of heat meltable material from relatively small containers practical. As the size of the apparatus for dispensing from a 5 gallon container, as compared with a 55 gallon drum, is significantly smaller than with the larger drum, the cost of the dispensing apparatus in accord with the invention, the space occupied thereby and the complexity are all substantially reduced as compared with the known larger apparatus resulting in significant advantages thereover.

BRIEF DESCRIPTION OF THE DRAWINGS

The aforementioned objects and advantages of the invention will be appreciated from the following description and accompanying drawings wherein:

FIG. 2 is an enlarged sectional view of the head structure in accord with the invention, FIG. 3 is a perspective view of the head in accord with the invention, the upper cover plate and pump being removed therefrom, FIG. 4 is a top plan view of the head casting in accord with the invention, and FIG. 5 is a plan sectional view taken through the pump column along section V—V of FIG. 2.

Figure 1:
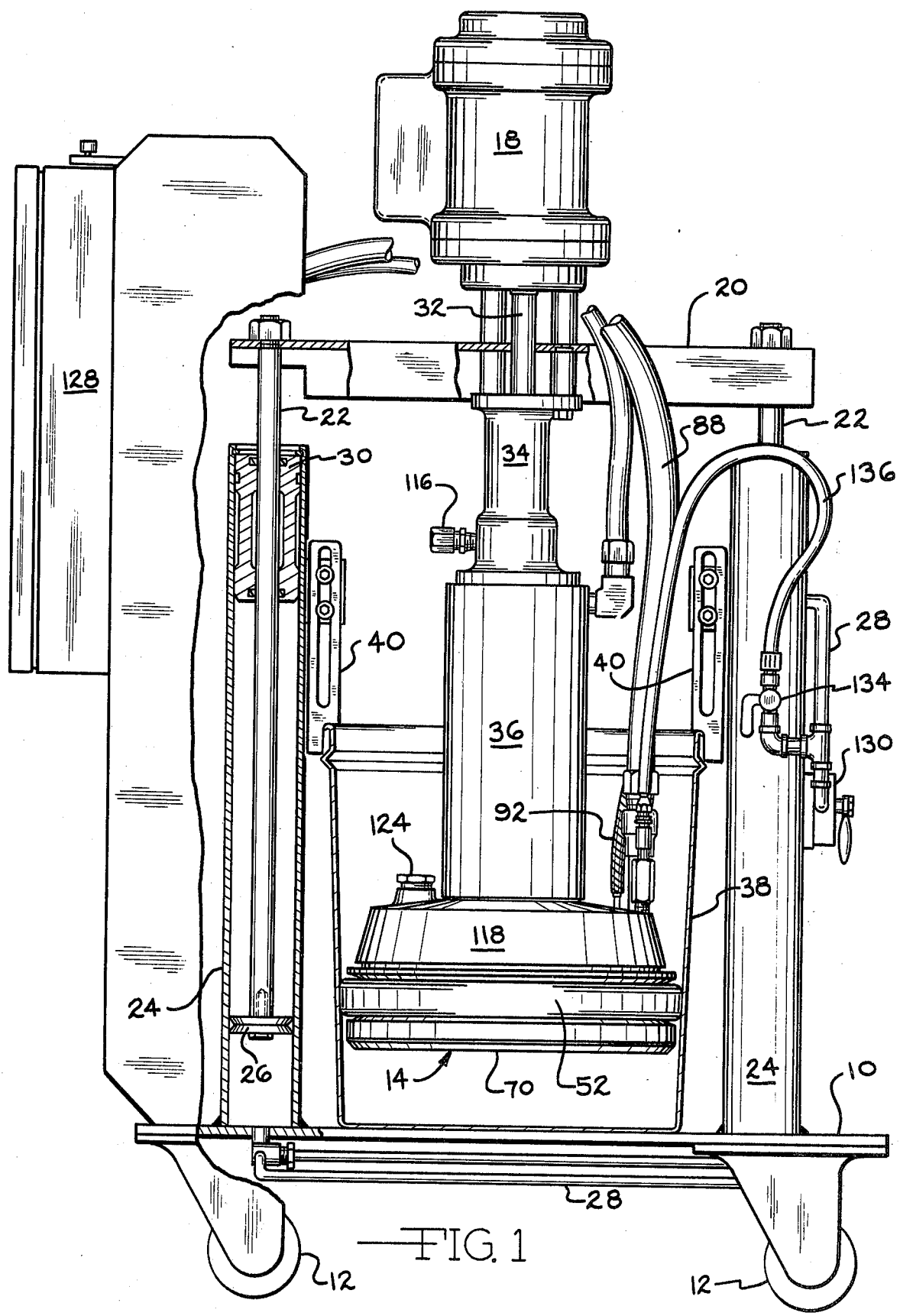
FIG. 1 is an elevational view, partially in section, illustrating dispensing apparatus in accord with the invention, the head being located within the container of material to be dispensed.

DESCRIPTION OF THE PREFERRED EMBODIMENT.

The overall arrangement of apparatus in accord with the invention is best appreciated from FIG. 1. As the apparatus of the invention is preferably utilized with 5 gallon pail containers, the apparatus is of a relatively concise size consisting of a movable support 10 mounted upon wheels 12 for ease of transport. The head 14, pump chamber 16, and pump motor 18, are mounted upon a vertically elevatable and retractable elevator frame 20 supported on support 10 by a pair of piston rods 22 extending into expansible air motor cylinders 24 mounted upon the support 10 and vertically disposed upon opposite sides of the head 14. The piston rods 22 each include a piston 26 sealed with respect to the inner wall of the associated cylinder 24 and appropriate conduits, such as at 28, communicate with the lower and upper regions of the cylinders to permit compressed air to enter the cylinders and raised and lower the frame 20 and associated structure. A bushing 30, located within the cylinders' upper regions, closely receives the piston rods 22 to provide lateral stability.

The pump motor 18 is of the reciprocal, air driven, double acting piston type having a piston rod 32 capable of powered reciprocation through a 4 inch stroke in either direction. This air motor is preferably of the type manufactured by the assignee, Pyles Industries, Inc., of Wixom, Mich., Model 89400-A, and is automatic in operation to produce piston rod reciprocation under the desired air pressure supplied.

Immediately below the frame 20 the pump head 34 is located as affixed to the frame and receiving the piston rod. The pump chamber 16 depends from the pump head 34 and the structure thereof is encased within the exterior jacket 36, FIG. 2. The head 14 is mounted to the lower end of the pump chamber 16 as will be appreciated from FIG. 2.

The container, or pail, 38 of approximately 5 gallons of heat meltable material, is located between the cylinders 24 upon the flat surface of the support 10 and is maintained in position by the holddown brackets 40, FIG. 1., mounted upon the cylinders. The vertical axis of the pail is aligned with the vertical axis of the head 14 and the pump chamber 16.

The head 14 is preferably formed of an aluminum casting of circular configuration. The head includes a lower base region 42, upwardly vertically extending peripheral wall 44 and has a hollow interior defining the reservoir 46. Externally, an annular seal ring 48 is disposed about the periphery of the head and mounted thereto by screws 50, FIG. 2, and a resilient silicone sealing ring 52 is received within the groove 54 of the sealing ring for establishing a sealed relationship with the interior surface of the pail 38, FIG. 2, regardless of whether the pail is of the straight side or tapered side type.

As shown in FIGS. 3 and 4, a generally circular web 56 homogeneously extends from the base region 42 into the reservoir 46 and a concentric web or boss 58 likewise extends from the base region 42 within the web 56, and is of a thicker radial dimension, having and inner cylindrical surface 60 capable of closely receiving the pump chamber cylinder, as will be later described. An upstanding radial web 62 interconnects web 56 and boss 58, and an inlet passage 64, FIG. 2, extends vertically through the web 62 intersecting the web surface 66 disposed adjacent the upper region of the reservoir. The lower portion of the inlet passage 64 intersects the inlet opening 68 defined in the base region lower surface 70, FIG. 2.

With reference to FIG. 2, it will be appreciated that a central depression 72 is defined in the lower surface 70 of the head 14, and the inelt opening 68 communicates with this lower surface depression.

A well 74 is defined at the central region of the reservoir 46 in alignment with boss 58 extending into the base region 42, and the base region is also provided with a well entrance 76 also disposed below the lower surface 78 of the reservoir. Thus, liquid material within the reservoir 46 enters the well entrance 76 and the well 74, as these portions constitute the lowermost portion of the reservoir.

Three heater receiving passages 80 are drilled in the base region 42 as represented by dotted lines in FIG. 4, and these passages receive electric resistance heaters 82, FIG. 2. Further, the head 14 is provided with electric conductor receiving passage 84 which communicates with one of the passages 80 and through which all of the resistance heaters 82 are electrically connected to a supply through conductors 86 and the cable 88. A vertical passage 90 defined in the head receives the heat sensing thermocouple 92 which regulates the operation of heaters 82 permitting accurate temperature control of the head.

The pump structure is illustrated in FIG. 2 and includes a cylindrical pump chamber 16 having an outer diameter closely received within the bore of the head boss 58. The pump chamber 16 includes check valve structure 94 at its lowermost end including ball valve 96 and the lower end of the pump chamber constitutes an inlet 98 for the check valve 94. The air motor piston rod 32 supports at its lower end a piston 100 reciprocal within the pump chamber 16 and a check valve 102, located in the piston, permits the heat meltable material to be drawn up through the inlet 98, past check valve 94, through piston check valve 102, and into the upper regions of pump chamber 16 through piston outlets 104 into pump head 34.

The upper region of the pump chamber 16 is maintained at a material melting temperature by electric resistance heaters 106 attached by a pair of band clamps 110 to heating sleeve 108 which surrounds the chamber 16. Thermostat 112 senses the temperature of the sleeve 108 and maintains the desired temperature thereof through electrical conductors 114 attached to the heating elements 106.

Discharge of the liquid melted material from the pump chamber and pump head takes place through fitting 116 located on the pump head 34 and a dispensing hose, not shown, is attached to the fitting 116 and will include electric heating means to maintain the hose at a material melting temperature, as is well known.

The head 14 and reservoir 46 are enclosed at their upper region by a cover plate 118 attached to the reservoir by screws 120, and the pump chamber structure is affixed to the head 14 by three bolts 122, FIGS. 2 and 5, threaded into the cover plate extending between the pump head 34 and the cover plate. A vent valve 124 utilizing a ball check valve 126 is mounted in the head 14 to permit air to enter the reservoir if the rate of dispensing is greater than the rate melted material enters the reservoir through inlet passge 64.

The control structure for the apparatus is mounted within cabinet 128, which straddles the left cylinder 24 on support 10, FIG. 1, and includes the heater controls and other control devices for operating the apparatus and, as this control structure is of a conventional nature, it forms no part of the present invention and is not described in detail.

In operation, the lower ends of the cylinders 24 are pressurized with air by the operation of valve 130, to raise the pistons 26 to their uppermost position against bushings 30 to elevate frame 20.

Upon raising the frame 20 to its uppermost position the head 14 will be located a sufficient vertical distance above the support 10 to permit a 5 gallon pail or container 38 of heat meltable material to be located below the head, and maintained upon the support by brackets 40. Thereupon, the frame 20 is lowered to permit the head 14 to enter the pail 38 and, in doing so, the sealing ring 52 will engage the inner surface of the pail and the head will enter the pail until the head lower surface 70 engages the upper surface of the hardened material within the pail.

The electric resistance heaters 82 and 106 are energized, if they have not previously been turned on, and the head 14 begins to rapidly heat to a temperature capable of melting the material within the pail 38. Only the material immediately adjacent the head lower surface 70 will melt and, due to the downward pressure exerted on the material in the pail by the head 14 under the influence of the air pressure on the upper side of the pistons 26, the melted material will be forced upwardly through inlet opening 68 into the inlet passage 64 into the reservoir 46, as represented in FIG. 2. The melted material enters the reservoir 46 over surface 66, flows about the web 56, and enters the well entrance 76 and well 74 and the pump inlet 98. Energization of the pump air motor 18 to cause reciprocation of the piston 32 will pump the melted material upwardly through the piston 100, chamber 16, pump head 34, and to the hose fitting 116 for dispensing.

In use, only that portion of the heat meltable material adjacent the head lower surface 70, such as above line 132, FIG. 2, will be in a liquid state capable of being forced up into the reservoir 46, and the downward force on the head 14 will maintain the reservoir filled as long as the rate of melting is greater than the rate of dispensing. As the material within the reservoir 46 is supported upon the heated base region 42, and as the web 56 and boss 58 extend through the material and function as heat exchangers within the reservoir, the material within the head is in a very fluid state capable of being readily pumped and dispensed.

Under normal operating conditions, the rate of melting is greater than the rate of dispensing and the reservoir 46 will be filled, which causes vent valve ball 126 to seat to prevent material flow from vent 124. When the reservoir is full the resistance to further downward movement of the head becomes very high and further movement of the head ceases until more material is dispensed. If the rate of dispensing is greater than the rate of melting, the level of the material in the reservoir lowers, as permitted by vent 124, and the reservoir permits such a higher rate of dispensing without an interruption in supply of melted material.

When the head lower surface 70 engages the bottom of the pail depleting the material therein, air pressure is introduced into the cylinders 24 below the pistons 26 to raise the frame 20 to pull the head 14 from the pail and permit a new pail to be inserted under the head. The withdrawal of the head 14 from the pail is aided by the introduction of compressed air under the head through valve 134 and hose 136, FIG. 1, which communicates with head passage 138, FIG. 4, extending through the head intersecting lower surface 70. In this manner a vacuum is not created under the head 14 as it is withdrawn from the pail.

With conventional dispensing apparatus, continued dispensing of the meltable material during the changing of the pails would not be possible. However, as a significant amount of melted material is located within the head reservoir 46, the dispensing of melted material through the fitting 116 can continue to occur during the changing of the material containers by pumping material from the head reservoir and, as a delay is required to heat and melt the upper surface of the material within the newly placed full pail, the dispensing from the reservoir will also occur during this delay. Unless unusually large amounts of meltable material are required during the changing of the containers, the capacity of the head reservoir is sufficient to prevent an interruption in dispensing.

When it is desired to completely de-energize the apparatus it is usual to turn off the air pressure and the electrical supply to the resistance heaters. Of course, over any significant time period, such as overnight, the heat meltable material will reharden in the pail and within the head and pump chamber and must be remelted prior to dispensing during the next cycle of operation. However, as the head 14 is formed of a material having high heat conductivity, the material within the reservoir is directly engaging the base region 42, and the web 56 and boss 58 permits the material within the head reservoir 46 to be quickly melted and apparatus in accord with the invention may be placed into operation in a relatively short time as compared with apparatus directly dispensing from the material container.

It will be appreciated that as the inlet passage 64 communicates with the upper region of the reservoir 46, when the head 14 is pulled from an empty pail, only that melted material within the passge itself will flow from the inlet passage and the amount of material in the reservoir will remain at that level prior to the head being withdrawn from the empty pail.

Thus, it will be appreciated that the forming of a reservoir within the head 14, and pumping from this reservoir, provides advantages which permit a continuity of operation even when utilizing heat meltable material containers of relatively limited capacity. Further, the use of the reservoir within the head improves the heat exchange between the heat meltable material and the head, reducing the time required to render the apparatus operable.

It is appreciated that modifications to the inventive concept may be apparent to those skilled in the art without departing from the spirit and scope thereof.

I claim

1. Apparatus for dispensing heat meltable material from a container including a support for a container of heat meltable material, a vertically movable frame mounted upon said support, means for vertically positioning said frame, dispensing means mounted upon said frame for vertical movement therewith, said dispensing means including a head adapted to enter said container of heat meltable material for engagement with the upper surface thereof, said head including a lower surface engaging the material upper surface, heating means heating said head to melt the heat meltable material adjacent said lower surface, a reservoir inlet defined in said head lower surface, vertically extending wall surfaces and a lower surface defined on said head defining a reservoir for receiving and holding melted material within said head, said inlet communicating with said reservoir, and a pump connected to said head having a pump inlet communicating with said reservoir.

2. An apparatus for dispensing heat meltable material as in claim 1, said head being formed of heat conductive material, and heat exchanging means defined on said head extending into said reservoir to increase the exchange of heat from said head to the material within said reservoir.

3. An apparatus for dispensing heat meltable material as in claim 1, flow control means associated with said reservoir inlet preventing egress of melted material from said reservoir through said reservoir inlet.

4. An apparatus for dispensing heat meltable material as in claim 3, said reservoir including a lower region and an upper region, said flow control means comprising a passage defined in said head having an upper end communicating with said reservoir adjacent the upper region thereof, said passage including a lower end communicating with said reservoir inlet.

5. An apparatus for dispensing heat meltable material as in claim 1, wherein said reservoir includes an upper region and a lower region, said pump inlet being disposed adjacent said reservoir lower region.

6. An apparatus for dispensing heat meltable material as in claim 5, a well defined in said reservoir lower region, said pump inlet being located within said well.

7. An apparatus for dispensing heat meltable material as in claim 5, electric resistance heating means within said head located between said head lower surface and said reservoir lower region.

8. A head for dispensing heat meltable material from a container comprising, in combination, a body of heat conducting material having a base region, a circular wall periphery, and a lower surface, said base region and wall periphery defining a reservoir for receiving and holding melted material, within said body, a reservoir inlet passage defined in said body intersecting said lower surface and communicating with said reservoir, heating means mounted in said body, and a pump mounted on said body having a pump inlet located within said reservoir adjacent said base region and an outlet for dispensing melted material.

9. In a head for dispensing heat meltable material as in claim 8, wherein said reservoir inlet passage includes an outlet communicating with said reservoir at a locating vertically spaced above said base region.

10. In a head for dispensing heat meltable material as in claim 8, a well defined in said base region, said pump inlet being located within said well.

11. In a head for dispensing heat meltable material as in claim 8, a web defined in said body of the material thereof extending from said base region into said reservoir having an upper surface vertically spaced from said base region, said reservoir inlet passage being defined in said web and intersecting said web upper surface.

12. In a head for dispensing heat meltable material as in claim 8, said body lower surface including a central depression defined therein extending into said base region, said reservoir inlet passage intersecting said lower surface at said depression.

13. In a head for dispensing heat meltable material as in claim 8, said heating means comprising an electric resistance heater located within said base region, and heat exchanging projections extending from said base region into said reservoir to facilitate the heating of material within said reservoir.

14. In a head for dispensing heat meltable material as in claim 13 wherein said projections are of partial circular configuration concentric to the vertical axis of said body.

* * * * *